(12) United States Patent
Chong

(10) Patent No.: US 7,212,496 B1
(45) Date of Patent: May 1, 2007

(54) REMOTE TEST UNIT

(75) Inventor: Raymond L Chong, San Jose, CA (US)

(73) Assignee: Sunrise Telecom Incorporated, San Jose, CA (US)

( * ) Notice: Subject to any disclaimer, the term of this patent is extended or adjusted under 35 U.S.C. 154(b) by 920 days.

(21) Appl. No.: 10/029,662

(22) Filed: Dec. 18, 2001

Related U.S. Application Data

(60) Provisional application No. 60/279,351, filed on Mar. 27, 2001.

(51) Int. Cl.
    G01R 31/08    (2006.01)
    G08C 15/00    (2006.01)
    H04L 1/00     (2006.01)

(52) U.S. Cl. ............... 370/247; 370/241; 370/243; 370/245; 370/248; 370/249; 370/250; 370/253; 370/359; 370/421; 379/27.01; 379/27.04; 379/29.02; 379/32.04; 375/219; 375/220; 375/221; 375/224

(58) Field of Classification Search ............... None
    See application file for complete search history.

(56) References Cited

U.S. PATENT DOCUMENTS

| | | | |
|---|---|---|---|
| 5,444,782 A | * | 8/1995 | Adams et al. ............... 713/153 |
| 5,598,455 A | | 1/1997 | Bliven et al. ............... 379/27 |
| 5,732,213 A | * | 3/1998 | Gessel et al. ............... 709/224 |
| 6,177,801 B1 | | 1/2001 | Chong ............... 324/520 |
| 6,295,339 B1 | * | 9/2001 | Jollota ............... 379/22.04 |
| 6,584,148 B1 | * | 6/2003 | Zitting et al. ............... 375/222 |

OTHER PUBLICATIONS

U.S. Appl. No. 09/636,433, filed Aug. 11, 2000, Chong.
U.S. Appl. No. 09/574,696, filed May 17, 2000, Chong.

* cited by examiner

Primary Examiner—Chi Pham
Assistant Examiner—Raj Jain
(74) Attorney, Agent, or Firm—Mikio Ishimaru

(57) ABSTRACT

A remote test unit (RTU) and method of operation are provided for utilizes the ability of an access matrix ability to route signals. The RTU can emulate a central Digital Subscriber Line Modem (DSLM-C) for testing customer premises equipment containing a remote Digital Subscriber Line Modem (DSLM-R). The RTU can also emulate a DSLM-R for testing central offices equipment including a digital subscriber line access multiplexer (DSLAM) containing a DSLM-C. The RTU can also emulate a concentrator connected to the DSLAM, a router connected to the concentrator, an Internet service provider (ISP) connected to the router, and a web site connected to the ISP over the Internet. The RTU can further test, using emulation, ISO/OSI layers defined in the ISO/OSI reference model which are connected to the DSLAM.

54 Claims, 4 Drawing Sheets

REMOTE TEST UNIT

CROSS-REFERENCE TO RELATED APPLICATIONS

This application claims the benefit of U.S. Provisional patent application Ser. No. 60/279,351 filed Mar. 27, 2001.

The present invention relates to, and incorporates by reference: 1) U.S. patent application Ser. No. 09/295,857, entitled "Detection of Bridge Tap Using Frequency Domain Analysis," filed on Apr. 21, 1999, now U.S. Pat. No. 6,177,801 B1; 2) U.S. patent application Ser. No. 09/636,433, filed Aug. 11, 2000, a divisional of U.S. Pat. No. 6,177,801 B1; and 3) U.S. application Ser. No. 09/574,696, entitled "Digital Subscriber Line Access and Network Testing Multiplexer," filed on May 17, 2000.

TECHNICAL FIELD

The present invention relates generally to communication networks, and more specifically to the testing of communication networks.

BACKGROUND ART

The demand for access to digital communications networks, such as the Internet, is directly related to the speed or rate at which such networks can transfer data. Higher data transfer rates provide a foundation for increased communication efficiency and new types of communication applications or services. These, in turn, fuel demand for more widespread network access and still-higher data transfer rates.

Conventional analog modems currently provide a maximum data transfer rate of 56 kilobits per second (kbps). Other technologies, such as cable modem, can offer significantly improved performance, but typically require changes in a telecommunication network's underlying architecture. Such changes may necessitate large network infrastructure investments to meet user demand for network accessibility.

Digital Subscriber Line (DSL) technology provides increased communications bandwidth while using existing twisted-pair copper lines that are prevalent throughout much of the world. DSL delivers a basic data transfer rate of 128 kbps. High speed DSL, or HDSL, can deliver a data transfer rate of 1.544 megabits per second (Mbps) in North America, and 2.048 Mbps elsewhere. Asymmetric DSL, or ADSL, can deliver data rates upstream or sending path. Taken together, varying DSL technologies are referred to as xDSL.

A conventional xDSL communication network includes a Main Distribution Frame (MDF), an access matrix, a DSL Access Multiplexer (DSLAM), and a test unit. The MDF is coupled to the access matrix, which itself is coupled to the DSLAM and the test unit. The MDF, the access matrix, the test unit, and the DSLAM each reside at an xDSL service provider site (or Central Office). At a customer site, a set of Customer Premises Equipment (CPE) units is connected to the MDF. Each CPE unit includes an xDSL modem.

A network's high-speed backbone is characterized by a data transfer rate much greater than that associated with any given CPE unit. The DSLAM, the access matrix, and the MDF together provide a signal exchange interface between the high-speed backbone and the CPE units. The DSLAM includes a set of xDSL modems and signal multiplexing circuitry, while the access matrix includes computer-controlled switching circuitry.

Each CPE unit is coupled to the MDF via a network of twisted pair wiring. The signal transfer pathway between any given CPE unit and the MDF is commonly referred to as a "local loop." A local loop's maximum data transfer rate is dependent upon its electrical characteristics, as readily understood by those skilled in the art. Due to variations in signal path length, environmental conditions, and interconnection history, any given local loop's electrical characteristics may significantly differ from those of another local loop. Moreover, a local loop's electrical characteristics may change over time due to variations in twisted pair line conditions. As a result, the ability to accurately determine local loop electrical characteristics is critical to the installation and maintenance of xDSL connections.

The test unit includes hardware and software that facilitates local loop electrical characterization.

In the prior art configurations, when there is a non-operational connection between a CPE and the DSLAM in the central office, it is extremely difficult to determine if there is a defect in the CPE or in the DSLAM.

Another problem encountered with the prior art configurations is that there is no convenient way to facilitate upper layer testing.

What are needed are a system and a method for Central Office applications to carry out DSL Loop Impairment Diagnostics, Loop Prequalification, DSLAM/CPE emulation functions, and upper layer testing.

DISCLOSURE OF THE INVENTION

The present invention provides a remote test unit (RTU) and method of operation for utilizes the ability of an access matrix ability to route signals. The RTU can emulate a central Digital Subscriber Line Modem (DSLM-C) for testing customer premises equipment containing a remote Digital Subscriber Line Modem (DSLM-R). The RTU can also emulate a DSLM-R for testing central offices equipment including a digital subscriber line access multiplexer (DSLAM) containing a DSLM-C. The RTU can further emulate a concentrator connected to the DSLAM, a router connected to the concentrator, an Internet service provider (ISP) connected to the router, and a web site connected to the ISP over an Internet. The RTU can further test, using emulation, ISO/OSI layers defined in the ISO/OSI reference model which are connected to the DSLAM.

The present invention further provides a Remote Test Unit (RTU) which includes a logic circuitry adapted to emulate a central Digital Subscriber Line Modem (DSLM-C) for testing customer premises equipment containing a remote Digital Subscriber Line Modem (DSLM-R); and a Digital Subscriber Line Modem Central/Remote (DSLM-C/R) test head connected to the logic circuitry for connecting the logic circuitry to the DSLM-R. The logic circuitry is further adapted to emulate a DSLM-R for testing central offices equipment including a DSLAM containing a DSLM-C. The DSLM-C/R test head connects the logic circuitry to the DSLM-C.

The present invention further provides a network which includes a plurality of customer premises equipment. Each of the plurality of customer premises equipment contains a DSLM-R. The network further includes central offices equipment which includes a DSLAM containing a DSLM-C, a remote test unit (RTU), and an access matrix. The RTU includes a logic circuitry adapted to emulate the DSLM-C for testing the DSLM-R of the plurality of customer premises equipment; and a Digital Subscriber Line Modem Central/Remote (DSLM-C/R) test head connected to the logic circuitry for connecting the logic circuitry to the DSLM-R. The access matrix is adapted to selectively connect: (1) the plurality of customer premises equipment to the DSLAM, (2) the plurality of customer premises equipment to the RTU, and (3) the DSLAM to the RTU. The logic circuitry is further adapted to emulate the DSLM-R for testing the DSLM-C. The DSLM-C/R test head connects the logic circuitry to the DSLM-C.

The present invention further provides a method for testing a network which includes the steps of: (1) emulating a central Digital Subscriber Line Modem (DSLM-C); and (2) connecting the emulated DSLM-C to an access matrix for testing customer premises equipment containing a remote Digital Subscriber Line Modem (DSLM-R). The method may further includes the steps of: (3) emulating the DSLM-R; and (4) connecting the emulated DSLM-R to the access matrix for testing central offices equipment including a Digital Subscriber Line Access Multiplexer (DSLAM) containing the DSLM-C.

The present invention still further provides a method for testing, using emulation, an ISO/OSI layer connected to a Digital Subscriber Line Access Multiplexer (DSLAM). The ISO/OSI layer is selected from the group consisting of a network layer, a transport layer, a session layer, a presentation layer and an application layer.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
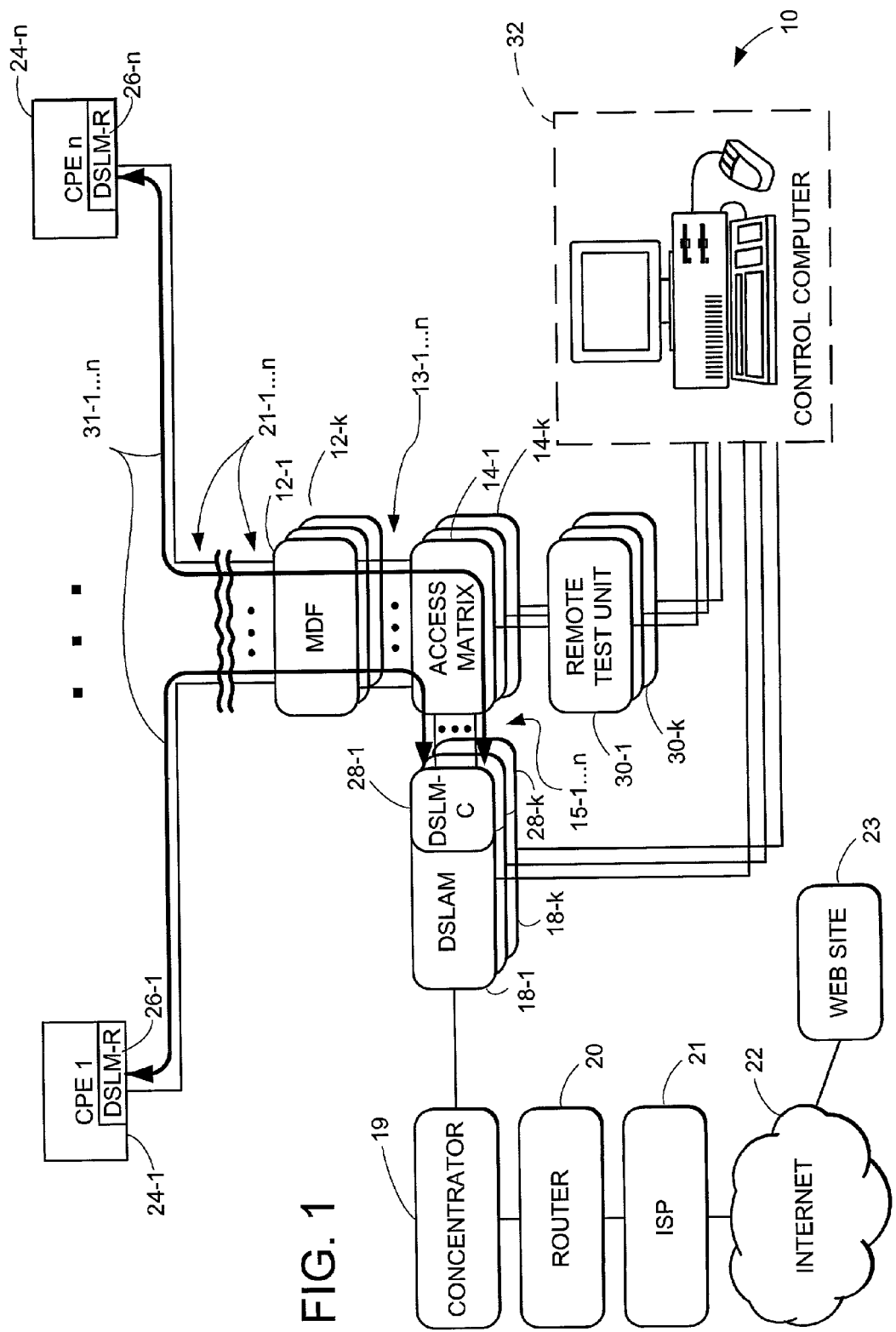
FIG. 1 is a block diagram of a Digital Subscriber Line communications network organization constructed in accordance with the present invention in the normal mode of operation.

Referring now to Table 1, therein is shown the International Organization for Standardization Open Systems Interconnect (ISO/OSI) reference model.

TABLE 1

| Layer No. | Layer Name | Functions |
| --- | --- | --- |
| 1 | Physical | Hardware connection |
| 2 | Data link | Transmission of information |
| 3 | Network | Transport routes, message handling and transfer |
| 4 | Transport | Reliability of communication, service quality |
| 5 | Session | Establishing, maintaining, and coordinating communication |
| 6 | Presentation | Text formatting and display, code conversion |
| 7 | Application | Program-to-program transfer of information |

The ISO/OSI reference model is a layered architecture that standardizes levels of service and types of interaction for computers exchanging information through a communication network. The ISO/OSI reference model separates computer-to-computer communications into seven protocol layers, or levels, each building and relying upon the standards contained in the layers below it.

The physical layer is the first layer in the ISO/OSI reference model and is hardware-oriented. The physical layer defines the physical characteristics of the interface, including the electrical, mechanical, procedural, and functional specifications for setting up, maintaining, and taking down the physical link between communicating computers (end systems). The copper loop test tests the physical layer using, for example, a time domain reflectometry (TDR), a resistance/capacitance test and background noise test.

The data link layer is the second layer in the ISO/OSI reference model and is one layer above the physical layer. The data link layer defines the specifications for sending and receiving information across a physical connection between two end systems.

The network layer is the third layer in the ISO/OSI reference model and is one layer above the data link layer. The network layer is used to manage multiple data link connections to ensure that information arrives at its intended destination.

The transport layer is the fourth layer in the ISO/OSI reference model and is one layer above the network layer. The transport layer manages the reliability and accuracy of information transmission, as well as the quality of service, such as perceptual speech quality measure (PSQM), and error detection and correction. The PSQM is a quality measure for a digital speech transmitted between two end systems.

The session layer is the fifth layer in the ISO/OSI reference model and is one layer above the transport layer. The session layer manages the details for the exchange of information that must be agreed on by the two communication devices.

The presentation layer is the sixth layer in the ISO/OSI reference model and is one layer above the session layer. The presentation layer is responsible for formatting information for display or printing, including interpreting codes (such as tabs or special graphic sequences), converting encryption, and translating other character sets.

The application layer is the seventh and the highest layer in the ISO/OSI reference model. The application layer is one layer above the presentation layer and defines a range of applications that handle file transfers, terminal sessions, and message exchange (e.g., electronic mail).

Referring now to FIG. 1, therein is shown a block diagram of a DSL communication network 10 constructed in accordance with the present invention.

The network 10 includes a plurality of Main Distribution Frames (MDFs) 12-1 through 12-*k*. A typical MDF 12-1 is connected by a plurality of lines 13-1 through 13-*n* to an access matrix 14-1. The network 10 would have a plurality of access matrices 14-1 through 14-*k* and a plurality of digital subscriber line access multiplexer (DSLAM) 18-1 through 18-*n*. The access matrix 14-1 is connected through a plurality of lines 15-1 through 15-*n* to a typical DSLAM 18-1. The typical DSLAM 18-1 is connected to a concentrator 19, which is a communications device that combines signals from multiple sources, such as a number of DSLAMs on a network, into one or more combined signals before sending them to their destinations. The concentrator 19 is connected to a router 20, which is an internetworking device that expedites message delivery by determining the optimal path along which network traffic (or signals) should be forwarded. The router 20 is connected to an Internet service provider (ISP) 21 that is connected to a high-speed network, such as an Asynchronous Transfer Mode (ATM) segment of the Internet 22. The router 20 routes the combined signals from the concentrator 19 to the Internet 22. A typical web site 23 is shown connected to the Internet 22. It should be noted that the concentrator 19 and the router 20 may be combined into one device. Further, the concentrator 19, the router 20, and the ISP 21 may be combined into one device. In addition, the ISP 21 may be a web site connected to the Internet 22.

When a user wants to access the ISP 21, the concentrator 19 checks to make sure that the user is allowed to log on by verifying the password and the log on ID. After the password and the log on ID are verified, the concentrator 19 assigns an Internet protocol (IP) address to the user for his access to the ISP 21. The router 20 then routes the signals from the user to the particular ISP Although different networks have the access matrix functions alternatively as part of the MDFs or of the DSLAMs, the overall operation of the present invention will be as herein described and within the scope of the present invention.

The typical MDF 12-1 is connected by a plurality of lines 21-1 through 21-n, such as telephone lines, from a central office to typical customer premises equipment (CPE) 24-1 on a customer site. The CPE 24-1 is one of a plurality of CPEs 24-1 through 24-n. It will be understood that the plurality of MDFs 12-1 through 12-k could be connected to a plurality of different customers.

Each of the CPEs 24-1 through 24-n contains a remote Digital Subscriber Line Modem (DSLM-R) 26-1 through 26-n, which is a modem used to communicate over the lines 21-1 through 21-n, the lines 13-1 through 13-n, and the lines 15-1 through 15-n with a typical central Digital Subscriber Line Modem (DSLM-C) 28-1, such as an xDSL modem, in the DSLAM 18-1. Each of the DSLAM 18-1 through 18-k contains a DSLM-C 28-1 through 28-k. Depending on the DSL communication network, the DSLM-R and DSLM-C can be the same or different. The lines 15-1 through 15-n are generally copper lines, but they may also be optical fiber, wireless, or a combination thereof.

A remote test unit (RTU) 30-1 of the present invention is connected to the access matrix 14-1. A plurality of RTUs 30-1 through 30-k could be connected to the access matrices 14-1 through 14-k, respectively, as well as having one RTU connected to a plurality of access matrices.

The plurality of RTUs 30-1 through 30-k are connected to one or more control computers which can be connected in different ways to different RTUs and which can be in different locations. A control computer 32 represents the one or more control computers. The control computer 32 may be a conventional computer system, typically including a workstation or server system having a processing unit and a data storage unit. The control computer 32 further includes an Input/Output (I/O) unit that facilitates user input via a keyboard and/or a mouse or other pointing device and a display device. A network interface unit or communication port is also included that facilitates signal exchange with the access matrices 14-1 through 14-k, the DSLAMs 18-1 through 18-k and the RTUs 30-1 through 30-k.

The DSLAMs 18-1 through 18-k are connected to the control computer 32.

In the general operational situation, the DSLAM are connecting to the CPE modem through two major blocks of devices. One of the devices is called access matrix. The other way is called MDF, main distribution frame. The access matrix basically provides a cross-connect that can select either a direct connection from the DSLAM to the MDF to the CPE, or it can block off the DSLAM but allow a RTU test head to be connected into the path and test the CPE modem. The access matrix also has a function that will block off the CPE and route the RTU signal in the DSLAM direction.

The access matrix function in normal operation mode connects the DSLAM through the MDF to the CPE modem. In a test mode it will allow either the remote test unit, RTU, to connect to the CPE modem, or allow the RTU to connect to the DSLAM. When the RTU is connected to the DSLAM, the access matrix blocks the connection between the RTU and the CPE modem, as well as the connection between the DSLAM and the CPE modem.

One aspect of the invention utilizes the access matrix ability to provide two test functions inside the RTU in addition to all layer, copper loop testing and emulate the equipment behind it. Some unique features of the invention are: (1) the RTU emulate a CPE modem; and (2) the RTU may emulate a DSLAM DSLM-C modem. During a test of a non-operational connection between the DSLAM and a CPE modem, the access matrix can block off the DSLAM and allow the RTU unit to connect to the CPE modem. In this test, the RTU will emulate the DSLM-C. Should the CPE respond to the test signals from the RTU, the RTU has determined that the defect is in the DSLAM DSLM-C. In the prior art it was extremely difficult to determine if the DSLM-C or the CPE were non-operational. The RTU can perform verification between the two units and becomes the judge of that situation.

In another mode, the access matrix routing mechanism is utilized to block off the CPE DSLM-R signal and route the RTU test signal towards the DSLAM communicating with the DSLM-C. In this mode, the RTU will emulate the DSLM-R or the CPE, and communicate with the DSLAM. If the DSLAM DSLM-C responds properly to the RTU's test signals, then the RTU has determined that the DSLAM DSLM-C is operating properly. The defect in the connection is then possibly at the DSLM-R.

Besides these unique layer test features, the RTU also includes physical layer test functions. Physical layer test functions are described in co-pending U.S. patent application Ser. No. 09/574,696, entitled "Digital Subscriber Line Access and Network Testing Multiplexer," filed on May 17, 2000.

Physical layer testing typically is single ended testing. There is no need for the CPE modem or other devices to respond. In some cases, however, physical layer testing includes double ended testing where another device, a CPE modem or a test device, responds to the RTU's test signals. Physical layer testing tests the lines 13-1 through 13-k and 21-1 through 21-k for shorts, breaks, and degradations. Physical layer testing tests may include, for example, background noise tests, time domain reflectometry tests, and capacitance/resistance tests. These tests are known to those of ordinary skill in the art and will not be described in details here.

Among the unique features of the RTU is the provision of testing capability for the physical layer as well as all other layers for multiple DSLAMs, access matrices and CPEs. Additionally, the RTU can test both the DSLAMs and the CPEs.

Figure 4:
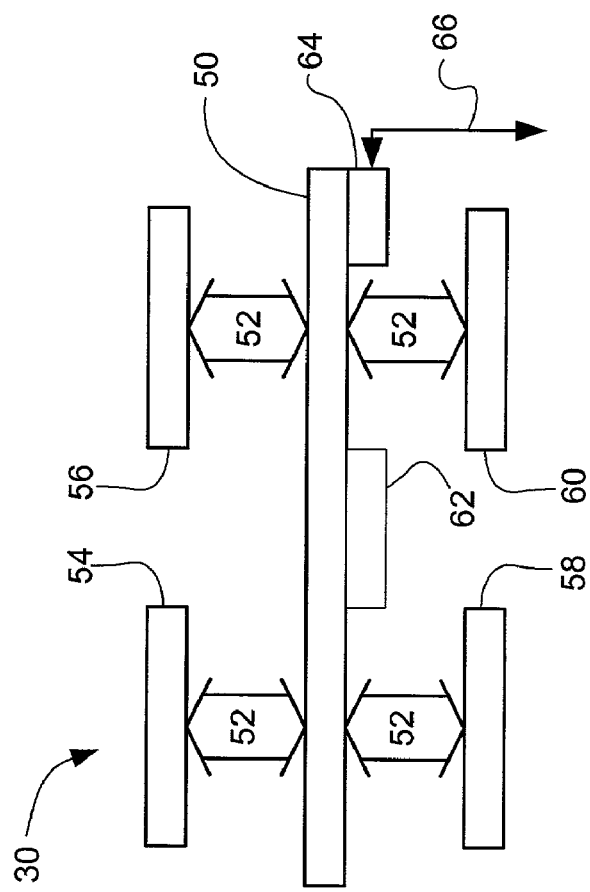
FIG. 4 is a block diagram of the Remote Test Unit of the present invention.

Referring now to FIG. 4, therein is shown a block diagram of the Remote Test Unit of the present invention. Another unique feature of the RTU is that the unit has multiple test heads. Each test head operates independently of the other test heads. The test heads may also operate simultaneously. In one embodiment, there are two CLT test heads and two modem emulation test heads, each of which incorporates a DSLM-R and a DSLM-C.

In this embodiment, there are eight test ports. The test ports are coupled to at least one MDF per access matrix, or as many as the access matrix will accept. So the RTU test ports are connected at least one MDF per access matrix. This means one single RTU can perform four tests simultaneously through a single access matrix or tests through four access matrices simultaneously.

Depending on how many test heads are inside the RTU, the lines can be tested sequentially or simultaneously in a parallel test. With two test heads, even though they are connected to the eight individual test access matrixes, there are only two test functions that can be operating simultaneously.

The development of the RTU allows two CLT, one CLT, one modem emulation board, or two emulation boards.

FIG. 1 will describe how an access matrix is operating in the normal condition. DSLAM is communicating towards the CPE modem. The first normal paths are paths 31-1 through 31-n. The DSLAM is connected to the MDF and goes towards the DSLM-R. During normal operation, DSLM-C communicates with DSLM-R.

Figure 2:
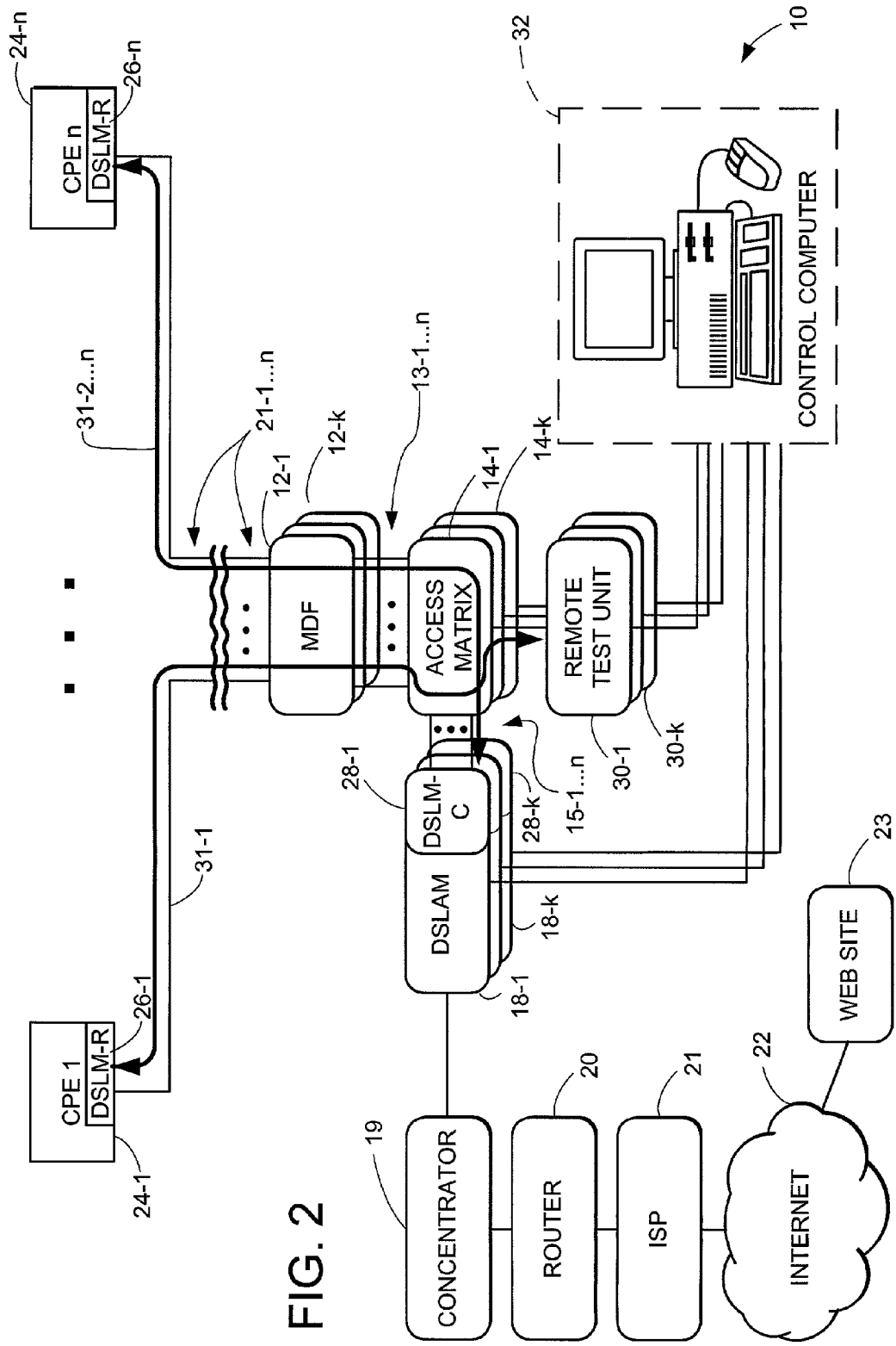
FIG. 2 is a block diagram of a Digital Subscriber Line communications network organization constructed in accordance with the present invention in one test mode of operation.

In FIG. 2, the RTU blocks off the access matrix towards the typical DSLAM 18-1 and then the typical RTU 30-1 will be testing the modem at the far end CPE 1 on path 32. The normal operation for other path is to go through paths 31-2 through 31-n. So the access only blocked off one line. The rest of the lines 21-2 through 21-n still communicate in the normal operation mode. In this case, the RTU 30-1 is emulating DSLM-C 28-1 towards DSLM-R 26-1 in CPE 1. In other words, test condition CPE 1 with DSLM-R 1 is communicating with RTU 30-1, which is emulating the DSLM-C modem 28-1.

DSLM emulation is a full emulation. The RTU DSLM-C operates as the DSLAM DSLM-C operates when it is connected to the concentrator 19 and router 20 through the ISP 21 to the Internet 22. Commands can be sent between the RTU 30-1 and a PC (not shown), which is typically connected behind the CPE modem 26-1. So that in this case the RTU has the ability and actually can respond to those commands where responses to those commands are required. It is full-blown so that the hub characteristics and web page browsing can be emulated.

The RTU can be setup for any type of emulation desired. Right now it emulates the DSLAM so that, if the DSLAM does not indicate anything connecting behind the trunk side, there is nothing connected to it. But it will tell if the DSLM-C is broken. It doesn't matter where the upper layer is broken. But it is at this point that the condition of the DSLM-C modem chip itself can be verified. It doesn't matter where the upper layers are because, if a dial up is performed from a home to an ISP, maybe the ISP is broken, but the modem itself will be linking up. It is possible to know that the link up is there but maybe the password is not accessible, at least it tells that the link is working. So this particular feature, the remote test head, at least indicates that the physical and the first layer of transport are working.

There is a DSLM-C modem inside the RTU through which the RTU emulates the entire DSLAM. There is a DSLM-C modem there because it is transmitting to that DSLM-R modem.

In another embodiment, the RTU emulates a CPE all the way through password and account assignment to reach a web site via an ISP. The CPE can perform an operation according to the Packet Internet Grouper (ping) protocol to ping to the RTU and download web site information from the RTU. Ping is a protocol for testing whether a particular computer is connected to the Internet by sending a packet to its IP address and waiting for a response.

Figure 3:
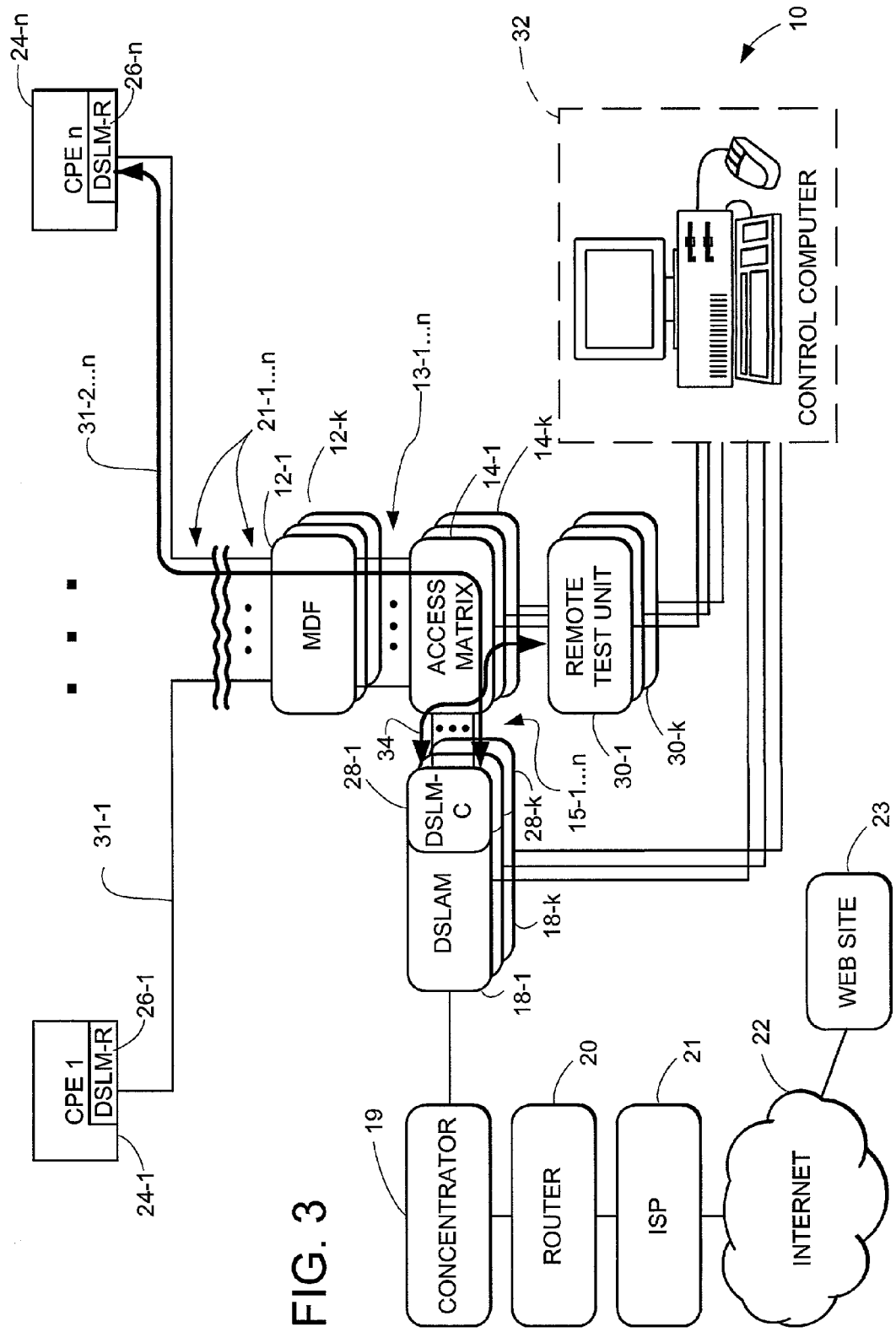
FIG. 3 is a block diagram of a Digital Subscriber Line communications network organization constructed in accordance with the present invention in another test mode of operation.

Referring now to FIG. 3, therein is shown the connection towards the DSLAM 1 port from the RTU along a path 34. The DSLAM contains the DSLM-C, so the DSLM-R in the typical RTU 30-1 is used to emulate the CPE 1 DSLM-R. In this case, the connection from the CPE DSLM-R 1 is blocked off. The access matrix 14-1 is doing this. The access matrix 14-1 is usually available to do this kind of routing. This feature is just used to work with the RTU 30-1. The DSLM-R and the DSLM-C both reside in the remote test unit in separate chips. Only the line being tested is blocked off. All the other lines in the access matrix 14-1 are operating in a normal mode. Path 34 indicates the connection between the RTU 30-1 through the access matrix 14-1 towards the DSLAM 18-1 and in this case the RTU 30-1 is utilizing its DSLM-R modem chip. The rest of the connections from the DSLAM 18-1 towards other modems are still operational. In the test condition, the RTU 30-1 with DSLM-R modem is connecting to a port 1 of DSLAM 18-1, which has DSLM-C modem 28-1. This condition is to verify if the DSLM-C modem 28-1 inside the DSLAM 18-1 is operational or broken. All other lines are still operational.

As discussed earlier, layer 2 is the data link layer (modem) and layer 1 is the physical layer. It is necessary to distinguish between a broken line to the modem versus a broken modem. For example, if the connections towards the DSLAM are made that means the DSLAM DSLM-C modem is fine. The DSLM modems have internal signature circuitry, which indicate the presence of the modem. When a connection is made to the CPE side and there is no response, it cannot be determined if the modem is broken or the line is broken. The CLT has functions, which can find out whether the far end has a modem connected or not. Some modems have a signature circuit and regardless whether that modem is on and off it is possible to identify that signature circuit. For instance this signature circuit is two back-to-back diodes. Back to back diodes have a breakdown voltage. Normally, it is blocked off, but when exceeding certain breakdown voltage, it will pass current. Regardless whether the modem is on or not. By detecting the signature circuit, it can be determined that a modem is there even if it can not be determined if the modem is operational. If the circuit cannot be detected, then the line may be broken. Then, it is necessary to do time domain reflectometry (TDR) to find out where the break is. In TDR, a pulse is sent towards the far end and the pulse when it reaches infinite impedance, a broken line, it will be reflected back down the line. By measuring the time and knowing the speed of the pulse, the distance traversed by the pulse can be calculated. Dividing the distance by two since it is twice the distance because it is round trip, the distance to the break can be calculated.

On a single port, tests can be done towards the DSLAM side and also the CPE side. The RTU CLT can test any line. Those skilled in the art will recognize that numerous features can be added onto that architecture.

FIG. 3 shows that it is possible for one RTU to have multiple connections to the access matrix. Essentially, there are an infinite number of accesses.

Referring now to FIG. 4, therein is shown a block diagram of the RTU 30 of the present invention at the physical layer. The RTU 30 has a motherboard 50 with connections 52 to multiple test heads such as DSLM-C/R test head 54, DSLM- C/R test head 56, and CLT test heads 58 and 60. In addition to testing the DSLM-C and DSLM-R and with the exception of testing the physical layer, the DSLM-C/R test heads 54 and 56 can be used to test all other layers in the ISO/OSI reference model. The motherboard 50 has logic circuitry 62 and an internal matrix 64 connected by leads 66 to a plurality of test ports (not shown). The logic circuitry 62 is responsible for emulating the DSLM-R, the DSLM-C, a concentrator, a router, an ISP, and a web site. The logic circuitry is further adapted to test, using emulation, ISO/OSI layers defined in the ISO/OSI reference model which are connected to the DSLAM. The internal matrix 64 is responsible for selectively connecting the DSLM-C/R test heads and the CLT test heads to the plurality of test ports.

It should be noted that there can be numerous combinations between the number of DSLM-C/R test heads and the number of CLT test heads. In another embodiment, the RTU 30 has a motherboard 50 with connections 52 to three DSLM-C/R test heads and one CLT test head.

Figure 5:
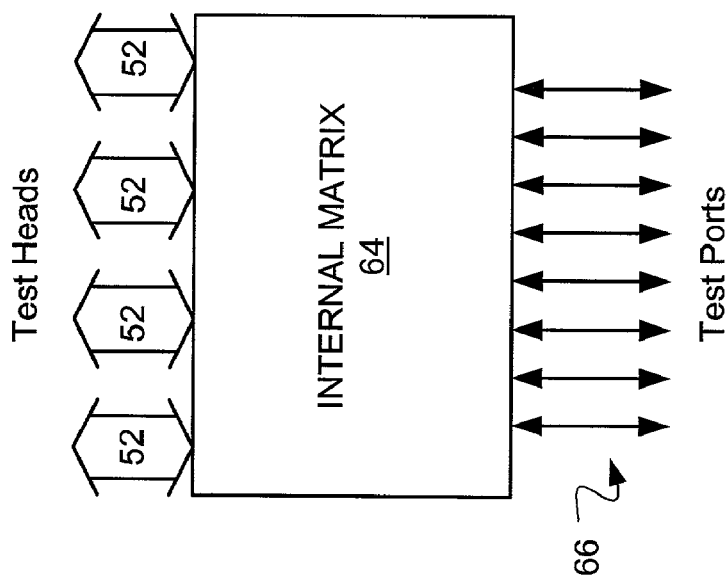
FIG. 5 is a schematic of a portion of the Remote Test Unit of the present invention.

Referring now to FIG. 5, therein is shown a schematic of a portion of the RTU 30 of the present invention at the logic layer. The internal matrix 64 could be a 4×8 matrix set up for four test heads with the four connections 52 and the eight leads 66 to the test ports (not shown). Each of the test ports is hard wired to one or more DSLAMs. This arrangement means that any of the four test heads can go in and out to any of the eight test ports one at a time. Therefore, if one test head is inoperative, another test head in the system can be available as an immediate replacement.

When performing layer testing towards a CPE, the data link layer and the physical layer testing can be performed simultaneously by shorting two leads 66. In this case, a DSLM-C/R test head and a CLT test head will be connected to the two shorted leads 66.

It should be noted that the ratio of the number of test ports to the number of DSLAMs can be varied. In one embodiment, each of the eight test ports is connected to a different DSLAM. In a second embodiment, all eight test ports are connected to one DSLAM. In the second embodiment, the DSLAM can access eight different ISPs (or web sites) or eight different CPEs simultaneously.

When doing the modem level testing, the first test is to do is to link up and link down. Then it is possible to come between the frames to determine the approximate number of errors transmitted. This is a far more sophisticated modulation technique. Normally, in the T1 or T3 or normal modem connection there is no information in the framing structure to indicate the error condition. It does the ping test. It is possible to do end-to-end connection from the CPE; i.e., emulating the CPE modem testing towards the DSLAM since the hub to the Internet is behind the DSLAM. This modem emulation allows not only emulation of a modem, but emulation of a PC behind that modem such that the PC can generate an IP command to anywhere in the Internet and get a response back. This is called an echo request and an echo can be obtained from any intelligent IP devices in the network. Not only is the CPE modem function provided, but continuity testing all the way to the upper PC layer. So when emulating a DSLM-R and testing into the DSLAM, both the modem level test on the framing bits and a ping test can be performed. While emulating a DSLM-C and testing out to a DSLM-R on the modem level, the link up test analyzes the framing bits.

Further, it is possible to emulate the concentrator, the router, the ISP, and a web site.

To emulate a concentrator or a router, which are typically at the network layer, the RTU would need to know the password and log on ID of the CPE. The RTU would simulate the concentrator or the router and make connection to a CPE to verify if the CPE has, for example, the proper software installed.

To emulate an ISP, at least the first contact point from the CPE side will be presented. The RTU will respond to an echo request. That means that it is not necessary to emulate the entire Internet, but to emulate the one place in the Internet where a ping can be generated and a response can be provided of all the data in the RTU. As a result, if the far end modem has a particular file to be transferred which is what is in a predetermined file, the RTU will provide the file and keep sending the test file so that the true network data rate throughput with the test file can actually be monitored.

To emulate a web site, the RTU will send a built in test page to the web site. The RTU will request the web site to send a return signal to confirm if the test page was received without any error, such as whether the color is correct, whether the test page is readable, etc. The web site may contain certain software that will minimize human intervention in responding to the request by the RTU. Instead of sending a test page, PSQM upon speech may be used to determine the quality of service provided by the RTU to the web site.

To test a CPE, the RTU will send the test page to the CPE.

In review, the RTU provides the emulation modems inside to emulate DSLM-C, DSLM-R, which can be SDSL, IDSL or any other modem subsequently developed. Furthermore, the RTU according to the present invention has multiple test functions. The CLT and the modem emulation are all inside the RTU. The RTU has eight ports. The test head becomes resource to the test ports. There are eight test ports and each one cannot locate all the allocated resources at the same time. The resource will be queuing lists for the operating system to assign. Once a function is requested, the queue list is examined and then when the resource returns access to the test port, the next test port will grab the resource and run the test function. In essence each test port thinks they have the entire resource list, which can be as much as in the entire unit, which has 4 test heads. Each test head has two functions at this port. There will be 8 test functions per test port. Totally it is equivalent to 64 testers or equivalent to 64 testers individually. A lot of access right now provides multiple test ports for the testers because there is no tester that can provide all this function. Therefore they provide multiple test access points. This tremendously reduces the cost of the access because now all that is required is just to have one test port and all the test resources are provided towards that test point.

For example, one access matrix 14 has approximately 25 access ports per card and about either 16 or 20 cards. This is about 400 to 500 access ports. With the RTU it is possible to connect 8 test ports 66 to those access ports to make an equivalent to 4,000 ports. The biggest access matrix currently has 2,000 ports per access. That means the RTU can connect to 2,000×8, which equals 16,000 access ports. This is contrasted to the current technology which can only access one access port. By providing multiple test accesses, the RTU significantly reduces the cost of access.

Also the RTU itself comes with a daisy chain that has two RS2 ports. This means it is possible to actually stack the RTU in the rack and then have multiple RTU, controlled by a single CPU. The stack of RTUs can also be connected to an Ethernet port.

As would be evident to those skilled in the art, the present invention may be used in any network, such as cable, Internet, enterprise, etc.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hitherto-fore set forth herein or shown in the accompanying drawings are to be interpreted in an illustrative and non-limiting sense.

The invention claimed is:

1. A Remote Test Unit (RTU), comprising:
   logic circuitry configured to emulate a central Digital Subscriber Line Modem (DSLM-C) for testing customer premises equipment containing a remote Digital Subscriber Line Modem (DSLM-R), the logic circuitry is further configured to test an ISO/OSI layer connected to the DSLAM, the ISO/OSI layer is selected from the group consisting of a network layer, a transport layer, a session layer, a presentation layer and an application layer; and
   a Digital Subscriber Line Modem Central/Remote (DSLM-C/R) test head connected to the logic circuitry for connecting the logic circuitry to the DSLM-R.

2. The Remote Test Unit of claim 1 wherein:
   the logic circuitry is further configured to emulate a DSLM-R for testing central offices equipment including a Digital Subscriber Line Access Multiplexer (DSLAM) containing a DSLM-C; and
   the DSLM-C/R test head connects the logic circuitry to the DSLM-C.

3. The Remote Test Unit of claim 1 further including:
   a copper loop testing (CLT) test head connected to the logic circuitry for connecting the logic circuitry to customer premises equipment; and wherein
   the logic circuitry is further configured to perform copper loop testing on a first connection between the logic circuitry and the customer premises equipment.

4. The Remote Test Unit of claim 3 further including:
   a plurality of test ports; and
   an internal matrix connected to the plurality of test ports for selectively connecting the DSLM-C/R test head and the CLT test head to the plurality of test ports.

5. The Remote Test Unit of claim 4 wherein:
   each of the plurality of test ports is connected to the DSLAM.

6. The Remote Test Unit of claim 4 wherein:
   the DSLM-C/R test head is connected to a first one of the plurality of test ports and the CLT test head is connected to a second one of the plurality of test ports, the first one of the plurality of test ports being shorted to the second one of the plurality of test ports.

7. The Remote Test Unit of claim 1 wherein:
   the logic circuitry is further configured to emulate a concentrator connected to the DSLAM.

8. The Remote Test Unit of claim 7 wherein:
   the logic circuitry is further configured to emulate a router connected to the concentrator.

9. The Remote Test Unit of claim 8 wherein:
   the logic circuitry is further configured to emulate an Internet service provider (ISP) connected to the router.

10. The Remote Test Unit of claim 8 wherein:
    the logic circuitry is further configured to emulate a web site connected to the ISP over an Internet.

11. A Remote Test Unit (RTU), comprising:
    logic circuitry configured to emulate:
    a central Digital Subscriber Line Modem (DSLM-C) for testing customer premises equipment containing a remote Digital Subscriber Line Modem (DSLM-R), the logic circuitry is further configured to test an ISO/OSI layer connected to the DSLAM, the ISO/ OSI layer is selected from the group consisting of a network layer, a transport layer, a session layer, a presentation layer and an application layer, and
    a DSLM-R for testing central offices equipment including a Digital Subscriber Line Access Multiplexer (DSLAM) containing a DSLM-C;
    a Digital Subscriber Line Modem Central/Remote (DSLM-C/R) test head connected to the logic circuitry for connecting the logic circuitry to the DSLM-R and for connecting the logic circuitry to the DSLM-C;
    a copper loop testing (CLT) test head connected to the logic circuitry for connecting the logic circuitry to the customer premises equipment; and wherein:
    the logic circuitry is further configured to perform copper loop testing on a first connection between the logic circuitry and the customer premises equipment;
    a plurality of test ports; and
    an internal matrix connected to the plurality of test ports for selectively connecting the DSLM-C/R test head and the CLT test head to the plurality of test ports.

12. The Remote Test Unit of claim 11 wherein:
    the logic circuitry is further configured to emulate a device selected from the group consisting of: a concentrator connected to the DSLAM, a router connected to the concentrator, an internet service provider (ISP) connected to the router, and a web site connected to the ISP over an Internet.

13. A network, comprising:
    a plurality of customer premises equipment, each of the plurality of customer premises equipment containing a remote Digital Subscriber Line Modem (DSLM-R);
    central offices equipment including a Digital Subscriber Line Access Multiplexer (DSLAM) containing a central Digital Subscriber Line Modem (DSLM-C);
    a remote test unit (RTU), the RTU including:
    a logic circuitry configured to emulate the DSLM-C for testing the DSLM-R of the plurality of customer premises equipment, the logic circuitry is further adapted to test an ISO/OSI layer connected to the DSLAM, the ISO/OSI layer is selected from the group consisting of a network layer, a transport layer, a session layer, a presentation layer and an application layer, and
    a Digital Subscriber Line Modem Central/Remote (DSLM-C/R) test head connected to the logic circuitry for connecting the logic circuitry to the DSLM-R; and
    an access matrix configured to selectively connect:
    the plurality of customer premises equipment to the DSLAM,
    the plurality of customer premises equipment to the RTU, and
    the DSLAM to the RTU.

14. The network of claim 13 wherein:
    the logic circuitry is further configured to emulate the DSLM-R for testing the DSLM-C; and
    the DSLM-C/R test head connects the logic circuitry to the DSLM-C.

15. The network of claim 14, wherein the RTU further includes:
    a copper loop testing (CLT) test head connected to the logic circuitry for connecting the logic circuitry to customer premises equipment; and wherein
    the logic circuitry is further configured to perform copper loop testing on a first connection between the logic circuitry and the customer premises equipment.

16. The network of claim 15, wherein the RTU further includes:
a plurality of test ports; and
an internal matrix connected to the plurality of test ports for selectively connecting the DSLM-C/R test head and the CLT test head to the plurality of test ports.

17. The network of claim 16, wherein:
each of the plurality of test ports is connected to the DSLAM.

18. The network of claim 15, wherein:
the DSLM-C/R test head is connected to a first one of the plurality of test ports and the CLT test head is connected to a second one of the plurality of test ports, the first one of the plurality of test ports being shorted to the second one of the plurality of test ports.

19. The network of claim 18 further including:
a concentrator connected to the DSLAM for combining signals from the DSLAM into combined signals; and wherein:
the logic circuitry is further configured to emulate the concentrator.

20. The network of claim 13 further including:
a router connected to the concentrator for routing the combined signals from the concentrator; and wherein:
the logic circuitry is further configured to emulate the router.

21. The network of claim 13 further including:
an Internet service provider connected to the router for receiving the combined signals and providing access to an Internet; and wherein:
the logic circuitry is further configured to emulate the ISP.

22. The network of claim 13 further including:
a web site connected to the ISP over the Internet; and wherein
the logic circuitry is further configured to emulate a web site connected to the ISP over the Internet.

23. The network of claim 13 wherein:
the access matrix is further configured to selectively connect:
one of the plurality of customer premises equipment to the RTU and block the one of plurality of customer premises equipment from the DSLAM; and
the DSLAM to the RTU and block the DSLAM from the plurality of customer premises equipment.

24. A network, comprising:
a plurality of customer premises equipment, each of the plurality of customer premises equipment containing a remote Digital Subscriber Line Modem (DSLM-R);
central offices equipment including a Digital Subscriber Line Access Multiplexer (DSLAM) containing a central Digital Subscriber Line Modem (DSLM-C);
a remote test unit (RTU), the RTU including:
a logic circuitry configured to emulate:
the DSLM-C for testing the DSLM-R, and
the DSLM-R for the DSLM-C,
the logic circuitry is further configured to test an ISO/OSI layer connected to the DSLAM, the ISO/OSI layer is selected from the group consisting of a network layer, a transport layer, a session layer, a presentation layer and an application layer,
a Digital Subscriber Line Modem Central/Remote (DSLM-C/R) test head connected to the logic circuitry for connecting the logic circuitry to the DSLM-R and for connecting the logic circuitry to the DSLM-C,
a copper loop testing (CLT) test head connected to the logic circuitry for connecting the logic circuitry to the customer premises equipment; and
wherein:
the logic circuitry is further adapted to perform copper loop testing on a first connection between the logic circuitry and the customer premises equipment,
a plurality of test ports, and
an internal matrix connected to the plurality of test ports for selectively connecting the DSLM-C/R test head and the CLT test head to the plurality of test ports, and
an access matrix adapted to selectively connect:
the plurality of customer premises equipment to the DSLAM,
the plurality of customer premises equipment to the RTU, and
the DSLAM to the RTU.

25. The network of claim 24 further including:
a concentrator connected to the DSLAM for combining signals from the DSLAM into combined signals;
a router connected to the concentrator for routing the combined signals from the concentrator;
an Internet service provider connected to the router for receiving the combined signals and providing access to an Internet; and
a web site connected to the ISP over the Internet; and wherein:
the logic circuitry is further adapted to emulate the concentrator, the router, the ISP, and the web site.

26. The network of claim 24 wherein:
the access matrix is further configured to selectively connect:
one of the plurality of customer premises equipment to the RTU and block the one of plurality of customer premises equipment from the DSLAM; and
the DSLAM to the RTU and block the DSLAM from the plurality of customer premises equipment.

27. A method for testing a network, comprising:
emulating a central Digital Subscriber Line Modem (DSLM-C);
connecting the emulated DSLM-C to an access matrix for testing customer premises equipment containing a remote Digital Subscriber Line Modem (DSLM-R); and
testing, using emulation, an ISO/OSI layer connected to the DSLAM, the ISO/OSI layer is selected from the group consisting of a network layer, a transport layer, a session layer, a presentation layer and an application layer.

28. The method of claim 27 further including:
emulating the DSLM-R; and
connecting the emulated DSLM-R to the access matrix for testing central offices equipment including a Digital Subscriber Line Access Multiplexer (DSLAM) containing the DSLM-C.

29. The method of claim 28 further including:
performing a copper loop testing (CLT) on a connection between the customer premises equipment and the central offices equipment.

30. The method of claim 28 wherein:
the step of connecting the emulated DSLM-C to an access matrix further includes the step of connecting the emulated DSLM-C to a first one of a plurality of test ports; and the step of connecting the emulated DSLM-R to an access matrix further includes the step of connecting the emulated DSLM-R to the first one of the plurality of test ports; and the step of performing a CLT on a connection between the customer premises equipment and the central offices equipment further including the step of connecting the central offices equipment to a second one of the plurality of test ports.

31. The method of claim 30 wherein:
each of the plurality of test ports is connected to the DSLAM.

32. The method of claim 30 wherein:
the first one of the plurality of test ports and the second one of the plurality of test ports are shorted.

33. The method of claim 27 further including:
emulating a concentrator connected to the DSLAM.

34. The method of claim 33 further including:
emulating a router connected to the concentrator.

35. The method of claim 34 further including:
emulating an Internet service provider (ISP) connected to the router.

36. The method of claim 34 further including:
emulating a web site connected to the ISP over an Internet.

37. The method of claim 28 wherein:
the step of connecting the emulated DSLM-C to an access matrix for testing the customer premises equipment blocks the customer premises equipment from the central offices equipment.

38. The method of claim 28 wherein:
the step of connecting the emulated DSLM-R to an access matrix for testing the central offices equipment blocks the central offices equipment from the customer premises equipment.

39. A method for testing a network, comprising:
emulating a central Digital Subscriber Line Modem (DSLM-C);
connecting the emulated DSLM-C to an access matrix for testing customer premises equipment containing a remote Digital Subscriber Line Modem (DSLM-R);
emulating the DSLM-R;
connecting the emulated DSLM-R to the access matrix for testing central offices equipment including a Digital Subscriber Line Access Multiplexer (DSLAM) containing the DSLM-C;
performing a copper loop testing (CLT) on a connection between the customer premises equipment and the central offices equipment; and
testing, using emulation, an ISO/OSI layer connected to the DSLAM, the ISO/OSI layer is selected from the group consisting of a network layer, a transport layer, a session layer, a presentation layer and an application layer.

40. The method of claim 39 wherein:
the step of connecting the emulated DSLM-C to an access matrix further includes the step of connecting the emulated DSLM-C to a first one of a plurality of test ports; and the step of connecting the emulated DSLM-R to an access matrix further includes the step of connecting the emulated DSLM-R to a second one of the plurality of test ports; and the step of performing a CLT on a connection between the customer premises equipment and the central offices equipment further including the step of connecting the central offices equipment to a third one of the plurality of test ports.

41. The method of claim 40 wherein:
the first one of the plurality of test ports, the second one of the plurality of test ports, and the third plurality of test ports are shorted.

42. The method of claim 39 further including:
emulating a concentrator connected to the DSLAM.

43. The method of claim 42 further including:
emulating a router connected to the concentrator.

44. The method of claim 43 further including:
emulating an Internet service provider (ISP) connected to the router.

45. The method of claim 44 further including:
emulating a web site connected to the ISP over an Internet.

46. The method of claim 39 wherein:
the step of connecting the emulated DSLM-C to an access matrix for testing the customer premises equipment blocks the customer premises equipment from the central offices equipment; and the step of connecting the emulated DSLM-R to an access matrix for testing the central offices equipment blocks the central offices equipment from the customer premises equipment.

47. A Remote Test Unit (RTU), comprising:
logic circuitry for emulating a central modem for testing customer premises equipment containing a remote modem; and
a modem central/remote test head connected to the logic circuitry for connecting the logic circuitry to the remote modem.

48. The Remote Test Unit of claim 47 wherein:
the logic circuitry is further for emulating a remote modem for testing central offices equipment including a multiplexer containing a central modem; and
the modem central/remote test head connects the logic circuitry to the central modem.

49. The Remote Test Unit of claim 47 further including:
a copper loop testing (CLT) test head connected to the logic circuitry for connecting the logic circuitry to customer premises equipment; and wherein
the logic circuitry is further for performing copper loop testing on a first connection between the logic circuitry and the customer premises equipment.

50. The Remote Test Unit of claim 49 further including:
a plurality of test ports; and
an internal matrix connected to the plurality of test ports for selectively connecting the modem central/remote test head and the CLT test head to the plurality of test ports.

51. The Remote Test Unit of claim 50 wherein:
each of the plurality of test ports is connected to the multiplexer.

52. The Remote Test Unit of claim 50 wherein:
the modem central/remote test head is connected to a first one of the plurality of test ports and the CLT test head is connected to a second one of the plurality of test ports, the first one of the plurality of test ports for being shorted to the second one of the plurality of test ports.

53. The Remote Test Unit of claim 47 wherein:
the logic circuitry is further for emulating a concentrator connected to the multiplexer.

54. The Remote Test Unit of claim 53 wherein:
the logic circuitry is further for emulating a router connected to the concentrator.

* * * * *